United States Patent [19]
Pinson

[11] Patent Number: 4,947,044
[45] Date of Patent: Aug. 7, 1990

[54] METHOD AND APPARATUS FOR COVERTLY VIEWING A TARGET USING INFRARED RADIATION

[75] Inventor: George T. Pinson, Huntsville, Ala.

[73] Assignee: The Boeing Company, Seattle, Wash.

[21] Appl. No.: 325,934

[22] Filed: Mar. 20, 1989

[51] Int. Cl.$^5$ .............................................. G02F 1/25
[52] U.S. Cl. .................................. 250/330; 250/341; 250/342
[58] Field of Search ............ 250/330, 333, 334, 338.1, 250/339, 340, 341, 342, 504 R, 504 H, 492.1, 495.1; 358/113

[56] References Cited

U.S. PATENT DOCUMENTS

| | | | |
|---|---|---|---|
| 3,111,587 | 11/1963 | Rocard | 250/504 R |
| 3,748,383 | 7/1973 | Grossman | 178/7.2 |
| 3,792,230 | 2/1974 | Ray | 219/343 |
| 4,064,402 | 12/1977 | Posnansky | 250/504 R |
| 4,091,412 | 5/1978 | Salonimer | 358/108 |
| 4,298,005 | 11/1981 | Mutzhas | 128/396 |
| 4,357,309 | 11/1982 | Arnold et al. | 423/486 |
| 4,542,299 | 9/1985 | Scholz et al. | 250/504 R |
| 4,704,595 | 11/1987 | Meyers | 250/504 R |

Primary Examiner—Janice A. Howell
Assistant Examiner—Richard Hanig
Attorney, Agent, or Firm—Finnegan, Henderson, Farabow, Garrett & Dunner

[57] ABSTRACT

A method and apparatus for covertly viewing a target using transmission of infrared radiation through an atmosphere having given atmospheric conditions. The target is illuminated with only a selected frequency band of infrared radiation having the least effective transmittance properties of all frequencies of infrared radiation in the given atmospheric conditions. This selected frequency band of infrared radiation is reflected from the target and detected. The selected frequency band of infrared radiation may be generated by generating a broad spectrum of infrared radiation and filtering this broad spectrum to output only the selected frequency band of infrared radiation. Alternatively, a laser may be employed to output the selected frequency band of infrared radiation.

9 Claims, 6 Drawing Sheets

METHOD AND APPARATUS FOR COVERTLY VIEWING A TARGET USING INFRARED RADIATION

BACKGROUND OF THE INVENTION

The present invention relates to a method and apparatus for covertly viewing a target using transmission of infrared radiation through an atmosphere having given atmospheric conditions.

Military and police operations at night have been a subject of great importance for many years. Many operations are covert in nature, therefore, high-intensity artificial illumination is unacceptable because it is detectable at great distances.

In the last decade a number of night imaging devices have been developed to aid soldiers and policemen in their operations. For example, filtered or shielded light sources have been used to provide illumination at night. However, these methods are unsuccessful when used to illuminate large areas because their low levels of intensity do not provide enough light to illuminate large areas.

Further, devices such as "low-light-level-goggles" and telescopes that use light-intensifiers have been developed. However, these devices are dependent upon the availability of natural light. Thus, their efficiency and usefulness degrades to an unusable level on moonless nights.

SUMMARY OF THE INVENTION

In view of the foregoing disadvantages of conventional night imaging devices, an object of the present invention is to provide high intensity artificial illumination that cannot be detected at long ranges and to eliminate dependency On natural light for image receiving.

To achieve these and other objects and in accordance with the purpose of the invention, as embodied and broadly discussed herein, the present invention provides a method of covertly viewing a target using transmission of infrared radiation through an atmosphere having given atmospheric conditions, comprising the steps of illuminating a target with only a selected frequency band of infrared radiation having the least effective transmittance properties of all frequencies of infrared radiation in said given atmospheric conditions, and detecting reflection of said selected frequency band of infrared radiation from said target.

Additionally, the present invention provides an apparatus for covertly viewing a target using transmission of infrared radiation through an atmosphere having given atmospheric conditions, comprising means for illuminating a target with only a selected frequency band of infrared radiation having the least effective transmittance properties of all frequencies of infrared radiation in said given atmospheric conditions, and means for detecting reflection of said selected frequency band of infrared radiation from said target.

BRIEF DESCRIPTION OF THE DRAWINGS

The accompanying drawings which are incorporated in and constitute a part of the specification, illustrate an embodiment of the invention and, together with the description, serve to explain the principles of the invention. The objects and features of the present invention will become apparent from the description of the preferred embodiment taken in conjunction with the accompanying drawings, wherein.

DESCRIPTION OF THE PREFERRED EMBODIMENT

Figure 1:
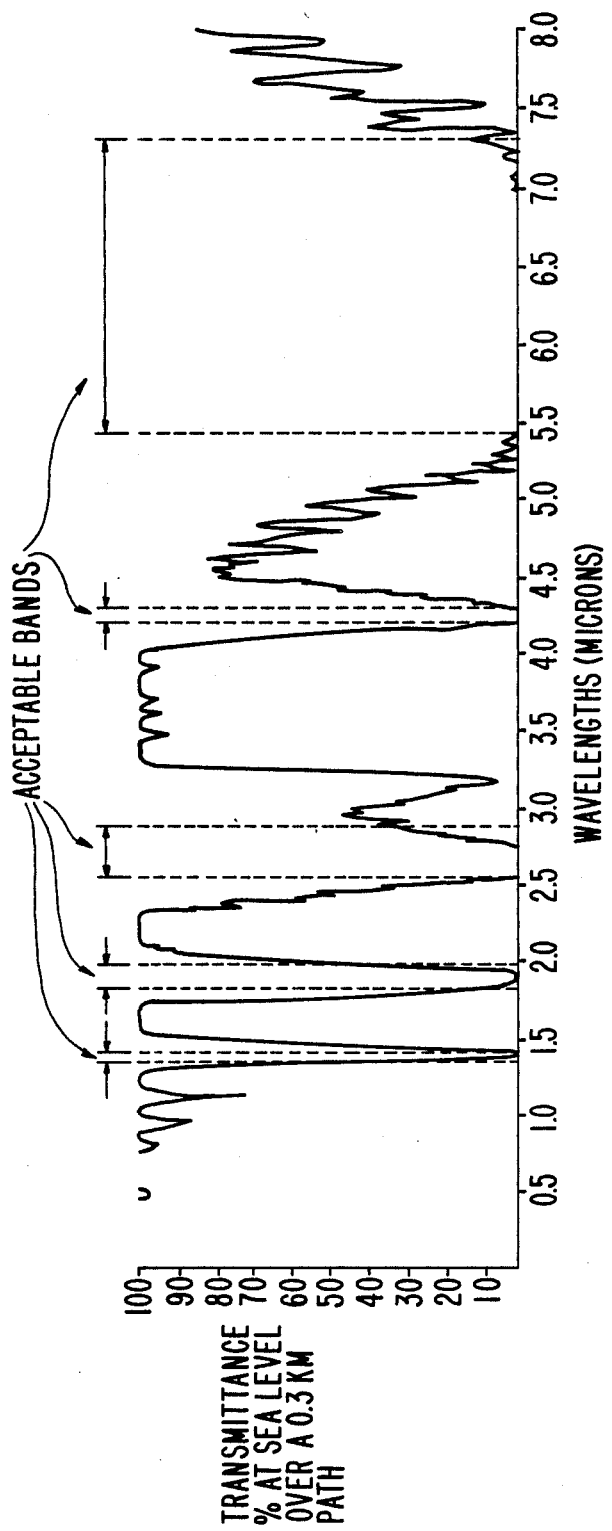
FIG. 1 is a graph showing the transmittance percentage for infrared radiation having particular wavelengths at sea level over a 0.3 km path.

As shown in FIG. 1, infrared radiation has poor transmittance properties at particular wavelengths in given atmospheric conditions. For example, the transmittance percentage at sea level over a 0.3 kilometer path is substantially zero percent for wavelengths of infrared radiation ranging from 1.38 to 1.39 microns, 1.84 to 1.94 microns, 2.55 to 2.86 microns, 4.2 to 4.3 microns and 5.5 to 7.3 microns. Radiant energy at these wavelengths is totally absorbed by water vapor and/or carbon dioxide in the atmosphere.

The present invention utilizes this phenomenon to produce artificial infrared illumination in the atmosphere which is absorbed within a distance long enough to illuminate immediate objects, but short enough to prevent detection of the illumination at greater distances.

An apparatus in accordance with the present invention comprises means for illuminating a target with only a selected frequency band of infrared radiation having the least effective transmittance properties of all frequencies of infrared radiation in given atmospheric conditions; and means for detecting reflection of the selected frequency band of infrared radiation from the target.

Figure 2:
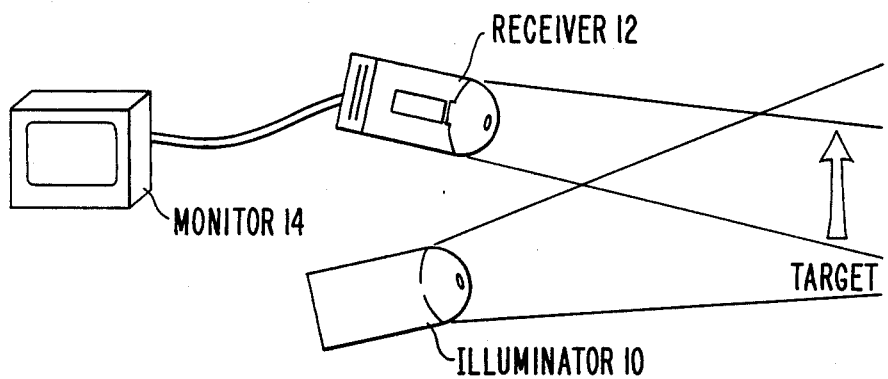
FIG. 2 is a block diagram of the basic components of the present invention.

As shown in FIG. 2, a preferred embodiment includes an illuminator 10, a receiver 12 and a monitor 14. The illuminator 10 illuminates a target with infrared radiation. The reflected infrared radiation is detected by the receiver 12 and monitored by an operator on the monitor 14.

In accordance with one embodiment of the invention, the means for illuminating a target preferably includes means for generating a broad spectrum of infrared radiation, and filter means for filtering the broad spectrum of infrared radiation so as to output only the selected frequency band of infrared radiation.

Figure 3A:
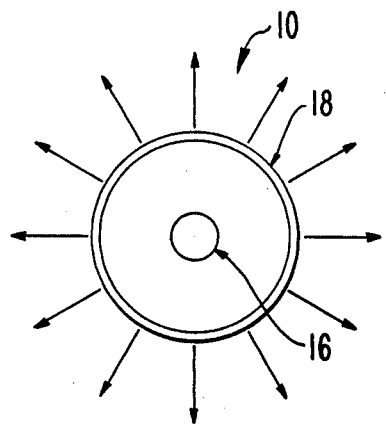
FIGS. 3a and 3b show different embodiments of an illuminator in accordance with the present invention.
Figure 3B:
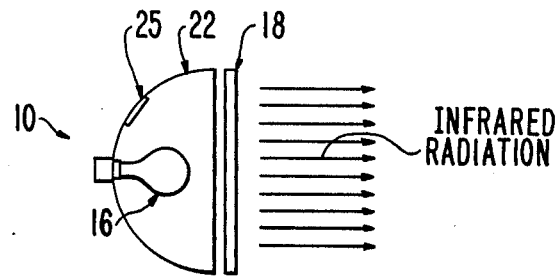

As illustratively shown in FIGS. 3a and 3b, by way of example, and not limitation, an illuminator is provided which comprises a light source 16 (such as a zeon-type lamp) for generating a broad spectrum of infrared radiation and a filter 18 (such as a heat transmitting mirror) for filtering the broad spectrum of infrared radiation so as to output only the selected frequency band of infrared radiation. The filter may consist of multiple elements and may be cooled or otherwise thermally controlled to minimize undesired radiation from leaving the light source.

Figure 4A:
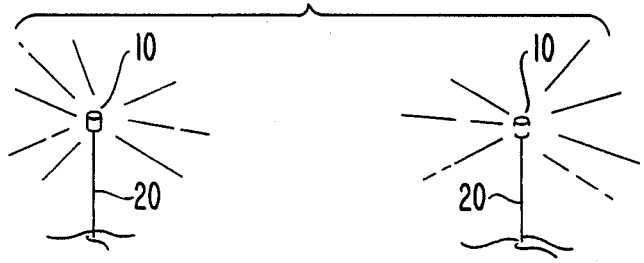
FIGS. 4a, 4b and 4c show particular uses for an illuminator in accordance with the present invention.

In FIG. 3a, the filter 18 is spherical in shape which allows radiation in all directions. Such an illuminator can be used to illuminate a general area or open space. FIG. 4 shows an exemplary use of this type of illuminator where the illuminator 10 is supported above the earth by a pole 20 and used to illuminate a general area for covert operations. While FIG. 3a shows a spherical shaped filter, it will be understood by those of ordinary skill in the art that the filter can have any shape allowing the light source to radiate in all directions.

Figure 4B:
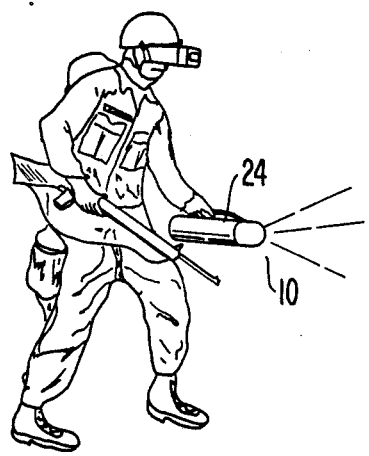
Figure 4C:
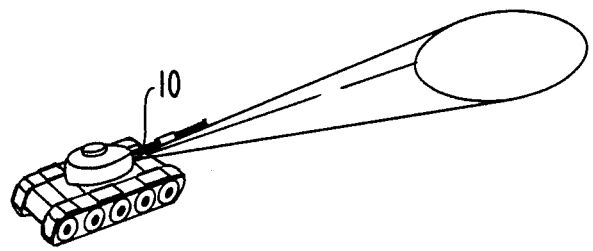

Alternatively, as shown in FIG. 3b, the illuminator 10 may include a reflector 22 to focus the infrared radiation. Focusing the infrared radiation enables the illuminator to be used as a spotlight for illuminating only a selected area. For example, the illuminator 10 may include a handle 24, as shown in FIG. 4b, so that the illuminator 10 can be hand carried and used to illuminate discrete areas selected by an operator. Further, the focused illuminator 10 may be mounted on a moving vehicle, such as a tank, and used to illuminate only the path to be traveled by the vehicle, as shown in FIG. 4c.

In the FIG. 3b embodiment, the filter 18 comprises a flat filter for filtering the infrared radiation output by the light source. One or more filters may be used as necessary to achieve the desired spectral output. In addition, a cooling device 25 is included in the reflector to reduce broad band IR radiation by reducing heat emitted by the reflector. This cooling device may comprise, for example, a liquid, thermoelectric or gas cooler.

In accordance with another embodiment of the invention, the filter means includes a first filter for filtering only infrared radiation above a first predetermined frequency and a second filter for filtering only infrared radiation below a second predetermined frequency.

Figure 5:
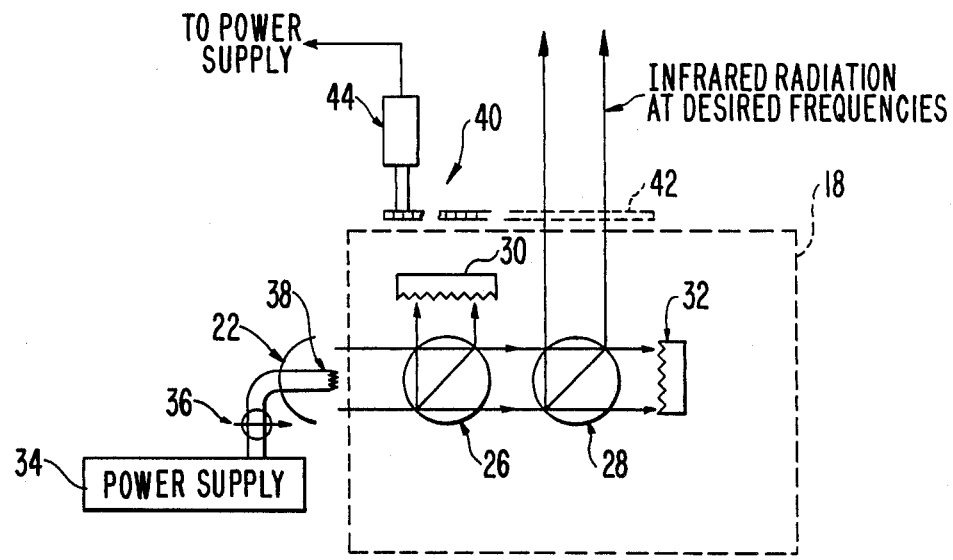
FIG. 5 shows a band pass filter arrangement in an embodiment of an illuminator in accordance with the present invention.

As illustratively shown in FIG. 5, by way of example and not limitation, the filter 18 comprises first and second interference filters 26 and 28, respectively, and first and second absorbers 30 and 32, respectively. Interference filters 26 and 28 operate as a tunable band pass filter. In particular, first interference filter 26 passes only those frequencies above a first predetermined frequency corresponding to the lowest frequency of the selected frequency band of infrared radiation. Those frequencies of infrared radiation below this first predetermined frequency are absorbed by the first absorber 30. Second interference filter 28 filters out all infrared radiation above the highest frequency of the selected frequency band of infrared radiation, which is absorbed by second absorber 32, and passes only those frequencies of infrared radiation below the highest frequency of the selected frequency band of infrared radiation.

For example, assuming the selected frequency band of infrared radiation corresponds to infrared radiation wavelengths of 1.38-1.39 microns (which, as shown in FIG. 1, has a transmittance percentage=zero at sea level over a 0.3 km path) the first interference filter 26 passes those frequencies having wavelengths $\geq 1.38$ microns. The second interference filter 28 passes only those frequencies having wavelengths $\leq 1.39$ microns. In this manner, first and second interference filters 26 and 28 operate as a band pass filter for filtering the broad spectrum of infrared radiation to output only the selected frequency band of infrared radiation having the least effective transmission properties of all frequencies of the infrared radiation in the given atmospheric conditions.

The remaining components of the illuminator 10 shown in FIG. 5 include a power supply 34, a power controller 36, a radiation source 38, and a chopper circuit 40 including a chopper 42 and a drive motor 44.

In operation, the radiation source 38 is energized by power supply 34. The power controller 36 controls the intensity of the illuminating infrared radiation which is output to the first and second interference filters 26 and 28. As described above, the interference filters 26 and 28 filter the infrared radiation so as to output only the selected frequency band of infrared radiation. The chopper circuit 40 may be provided to chop the infrared radiation output by the filter 18 to a desired frequency. In particular, drive motor 44 may be provided to rotate chopper 42 to chop the radiation.

As described with respect to FIGS. 2-5, the illuminator 10 comprises both a light source 16 and a filter 18 for outputting the selected frequency band of infrared radiation. In an alternative embodiment in accordance with the invention, the illuminating means includes a laser means for generating a laser beam at the selected frequency band of infrared radiation.

Figure 6:
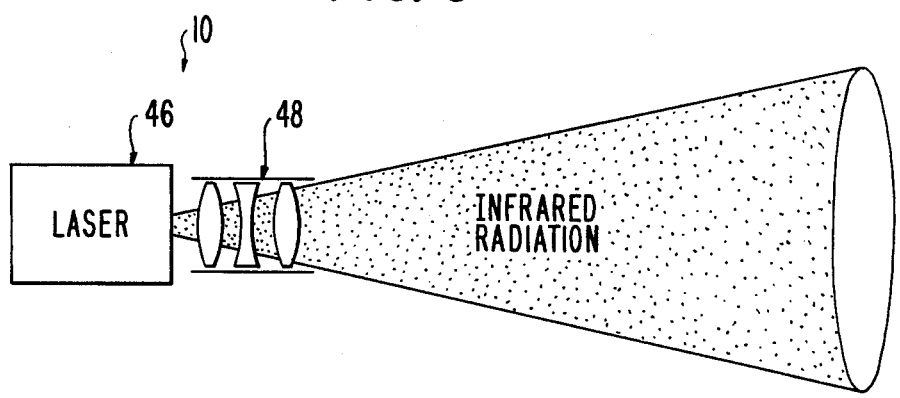
FIG. 6 shows an alternative embodiment of an illuminator in accordance with the present invention.

As illustratively shown in FIG. 6, by way of example and not limitation, the illuminator 10 comprises a laser 46 for generating a laser beam at the selected frequency band of infrared radiation. For example, a hydrogen-fluoride laser may be used to generate infrared radiation at a frequency having wavelengths of 1.38-1.39 microns. A beam spreader 48 may be provided to expand the laser beam to illuminate a broader area. The beam spreader 48 may comprise, for example, a divergent lens system, a reflective telescope or a scanner.

Referring back to FIG. 2, the receiver 12 used to detect reflected infrared illumination must be sensitive to the selected frequency band. This may include the use of existing night imaging devices as well as specially designed infrared imaging cameras. Such cameras may be based, for example, upon focal plane arrays sensitive to the selected wavelengths, single or multiple element scanning cameras, or pyroelectric videos sensitive to the desired wavelengths. The receiver may be mounted on a moving vehicle or located at a stationary position to receive the reflected image.

Additionally, the monitor 14 shown in FIG. 2, may comprise any conventional monitor used for displaying and monitoring the reflected image.

While the present invention has been described in terms of the foregoing embodiments, it should be understood that numerous modifications may be made thereto without departing from the spirit and scope of the invention and it is intended that the present invention covers the modifications and variations of the methods and devices provided herein which come within the scope of the appended claims and their equivalents.

We claim:

1. A method for covertly viewing a target using transmission of infrared radiation through an atmosphere having given atmospheric conditions, comprising the steps of:

illuminating a target with only a selected frequency band of infrared radiation having the least effective transmittance properties of all frequencies of infrared radiation in said given atmospheric conditions; and detecting reflection of said selected frequency band of infrared radiation from said target.

2. A method according to claim 1, further including the steps of generating a broad spectrum of infrared radiation, and filtering said broad spectrum of infrared radiation so as to output only said selected frequency band of infrared radiation for illuminating said target.

3. A method according to claim 1, wherein said selected frequency band of infrared radiation has a transmittance percentage value substantially equal to zero for said given atmospheric conditions over a predetermined distance.

4. An apparatus for covertly viewing a target using transmission of infrared radiation through an atmosphere having given atmospheric conditions, comprising:
   means for illuminating a target with only a selected frequency band of infrared radiation having the least effective transmittance properties of all frequencies of infrared radiation in said given atmospheric conditions; and
   means for detecting reflection of said selected frequency band of infrared radiation from said target.

5. An apparatus according to claim 4, wherein said means for illuminating a target includes means for generating a broad spectrum of infrared radiation, and filter means for filtering said broad spectrum of infrared radiation so as to output only said selected frequency band of infrared radiation.

6. An apparatus according to claim 4, wherein said means for illuminating a target includes laser means for generating a laser beam of said selected frequency band of infrared radiation.

7. An apparatus according to claim 4, further comprising handle means enabling an operator to carry said apparatus.

8. An apparatus according to claim 4, further comprising means for supporting said apparatus above the surface of the earth.

9. An apparatus according to claim 5, wherein said filter means includes a first filter for filtering only infrared radiation above a first predetermined frequency and a second filter for filtering only infrared radiation below a second predetermined frequency.

* * * * *